United States Patent
Wu et al.

(10) Patent No.: US 10,320,523 B2
(45) Date of Patent: Jun. 11, 2019

(54) METHOD FOR DETECTING SENT SEQUENCE, RECEIVER, AND RECEIVING DEVICE

(71) Applicant: Huawei Technologies Co., Ltd., Shenzhen (CN)

(72) Inventors: Bentao Wu, Shenzhen (CN); Bangning Mao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 15/617,759

(22) Filed: Jun. 8, 2017

(65) Prior Publication Data
US 2017/0272208 A1 Sep. 21, 2017

Related U.S. Application Data

(63) Continuation of application No. PCT/CN2014/093381, filed on Dec. 9, 2014.

(51) Int. Cl.
*H04L 1/00* (2006.01)
*H04L 27/34* (2006.01)
(Continued)

(52) U.S. Cl.
CPC ...... *H04L 1/0054* (2013.01); *H04L 25/03178* (2013.01); *H04L 27/3405* (2013.01); *H04L 27/38* (2013.01)

(58) Field of Classification Search
CPC . H04L 1/0054; H04L 25/03178; H04L 27/28; H03M 13/41
(Continued)

(56) References Cited

U.S. PATENT DOCUMENTS

| 5,617,509 A | 4/1997 | Kushner et al. |
| 2006/0056550 A1* | 3/2006 | Skraparlis ............. H04L 1/0631 375/347 |

(Continued)

FOREIGN PATENT DOCUMENTS

| CN | 1150490 A | 5/1997 |
| CN | 1968024 A | 5/2007 |
| CN | 1010877060 A | 11/2010 |

OTHER PUBLICATIONS

Machine Translation and Abstract of Chinese Publication No. CN1968024, May 23, 2007, 21 pages.
(Continued)

*Primary Examiner* — Kevin M Burd
(74) *Attorney, Agent, or Firm* — Conley Rose, P.C.

(57) ABSTRACT

A method for detecting a sent sequence, a receiver, and a receiving device in order to simplify an algorithm for detecting a sent sequence and improve detection efficiency. The method for detecting a sent sequence includes determining a maximum possible candidate value of each element in N elements of a received element sequence to obtain N maximum possible candidate values, where N is a positive integer, determining state sequences corresponding to the N maximum possible candidate values as reserved sequences to obtain N groups of reserved sequences, performing likelihood computation on the N groups of reserved sequences, and setting a reserved sequence that is in the N groups of reserved sequences and is most consistent with the element sequence as a detected sent sequence.

11 Claims, 3 Drawing Sheets

(51) Int. Cl.
   *H04L 27/38* (2006.01)
   *H04L 25/03* (2006.01)
(58) Field of Classification Search
   USPC .......................................................... 375/341
   See application file for complete search history.

(56) References Cited

U.S. PATENT DOCUMENTS

| | | |
|---|---|---|
| 2008/0008272 A1 | 1/2008 | Yang et al. |
| 2010/0278419 A1 | 11/2010 | Suzuki |
| 2011/0051861 A1* | 3/2011 | Yang .................... H04B 7/0854 |
| | | 375/341 |

OTHER PUBLICATIONS

Foreign Communication From a Counterpart Application, PCT Application No. PCT/CN2014/093381, English Translation of International Search Report dated Sep. 9, 2015, 2 pages.
Foreign Communication From a Counterpart Application, PCT Application No. PCT/CN2014/093381, English Translation of Written Opinion dated Sep. 9, 2015, 4 pages.

* cited by examiner

METHOD FOR DETECTING SENT SEQUENCE, RECEIVER, AND RECEIVING DEVICE

CROSS-REFERENCE TO RELATED APPLICATION

This application is a continuation of International Patent Application No. PCT/CN2014/093381 filed on Dec. 9, 2014, the disclosure of which is hereby incorporated by reference in its entirety.

TECHNICAL FIELD

The present disclosure relates to the communications field, and in particular, to a method for detecting a sent sequence, a receiver, and a receiving device.

BACKGROUND

In a communications system, a receiver is used to receive a signal, and determine, through computation, a sent sequence that is on a sending terminal and corresponds to a received sequence. In algorithms for determining a sent sequence, maximum likelihood sequence estimation (MLSE) can compensate for linear and nonlinear losses in the system, reduce a bit error rate, and achieve a better effect.

A basic principle of MLSE is to find, among all possible sent sequences, a sequence that is most consistent with a received sequence, and set this possible sent sequence as a detected sent sequence. Generally, a Viterbi algorithm (VA) is used to make complexity no longer related to a quantity of elements in a sequence, and thereby reduce complexity of MLSE. In this case, the two algorithms are jointly referred to as MLSE-VA. A consideration of the VA is to remove a survivor path that cannot become a maximum likelihood selection object on a lattice diagram.

However, in high-order quadrature amplitude modulation (QAM), as a system order increases, a quantity of operations in the MLSE-VA algorithm increases exponentially. Therefore, a method for detecting a sent sequence still includes a large quantity of operations and has low efficiency.

SUMMARY

The present disclosure provides a method for detecting a sent sequence, a receiver, and a receiving device in order to simplify an algorithm for detecting a sent sequence and improve detection efficiency.

According to a first aspect of this application, a method for detecting a sent sequence is provided and applied to a receiver, where the method includes determining a maximum possible candidate value of each element in N elements of a received element sequence to obtain N maximum possible candidate values, where N is a positive integer, determining state sequences corresponding to the N maximum possible candidate values as reserved sequences to obtain N groups of reserved sequences, performing likelihood computation on the N groups of reserved sequences, and setting a reserved sequence that is in the N groups of reserved sequences and is most consistent with the element sequence as a detected sent sequence.

With reference to the first aspect, in a first possible implementation of the first aspect, determining a maximum possible candidate value of each element in N elements of an element sequence to obtain N maximum possible candidate values includes setting i to an integer from 1 to N sequentially, and separately performing the following on an $i^{th}$ element. Making a hard decision on the $i^{th}$ element to obtain a decision value of the $i^{th}$ element, where the $i^{th}$ element is an element in the N elements, obtaining a first Euclidean distance between an I component of the $i^{th}$ element and an I component of the decision value of the $i^{th}$ element through computation according to the $i^{th}$ element and the decision value of the $i^{th}$ element, and determining the I component of the decision value of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

With reference to the first possible implementation of the first aspect, in a second possible implementation of the first aspect, after determining the I component of the decision value of the $i^{th}$ element as a possible value of the I component of the $i^{th}$ element or setting an I component value of one or two constellation points closest to the I component of the $i^{th}$ element as a possible value of the I component of the $i^{th}$ element, the method further includes obtaining a second Euclidean distance between a Q component of the $i^{th}$ element and a Q component of the decision value of the $i^{th}$ element through computation, and determining the Q component of the decision value of the $i^{th}$ element as a possible value of the Q component of the $i^{th}$ element when the second Euclidean distance is less than or equal to a second threshold, or setting, according to the constellation, a Q component value of one or two constellation points closest to the Q component of the $i^{th}$ element as a possible value of the Q component of the $i^{th}$ element when the second Euclidean distance is greater than the second threshold.

With reference to the first aspect, in a third possible implementation of the first aspect, determining a maximum possible candidate value of each element in N elements of an element sequence to obtain N maximum possible candidate values includes setting i to an integer from 1 to N sequentially, and separately performing the following on an $i^{th}$ element. Making a hard decision on an I component and a Q component of the $i^{th}$ element to obtain a decision value of the I component of the $i^{th}$ element and a decision value of the Q component of the $i^{th}$ element, where the $i^{th}$ element is an element in the N elements, obtaining a first Euclidean distance between the I component of the $i^{th}$ element and the decision value of the I component of the $i^{th}$ element through computation, and determining the decision value of the I component of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

With reference to the third possible implementation of the first aspect, in a fourth possible implementation of the first aspect, after determining the decision value of the I component of the $i^{th}$ element as a possible value of the I component of the $i^{th}$ element or setting an I component value of one or two constellation points closest to the I component of the $i^{th}$ element as a possible value of the I component of the $i^{th}$ element, the method further includes obtaining a second Euclidean distance between a Q component of the $i^{th}$ element and a decision value of the Q component of the $i^{th}$ element through computation, and determining the decision value of the Q component of the $i^{th}$ element as a possible value of the Q component of the $i^{th}$ element when the second Euclidean distance is less than or equal to a second threshold, or setting, according to the constellation, a Q component value of one or two constellation points closest to the Q component of the $i^{th}$ element as a possible value of the Q component of the $i^{th}$ element when the second Euclidean distance is greater than the second threshold.

With reference to the second possible implementation of the first aspect or the fourth possible implementation of the first aspect, in a fifth possible implementation of the first aspect, determining a maximum possible candidate value of each element in N elements of an element sequence to obtain N maximum possible candidate values further includes combining the possible value of the I component of the $i^{th}$ element and the possible value of the Q component of the $i^{th}$ element to obtain a maximum possible candidate value of the $i^{th}$ element, and obtaining the N maximum possible candidate values.

According to a second aspect of this application, a receiver is provided and includes a receiving module configured to receive an element sequence, and a detection module, connected to the receiving module, and configured to determine a maximum possible candidate value of each element in N elements of the element sequence to obtain N maximum possible candidate values, determine state sequences corresponding to the N maximum possible candidate values as reserved sequences to obtain N groups of reserved sequences, and perform likelihood computation on the N groups of reserved sequences, and set a reserved sequence that is in the N groups of reserved sequences and is most consistent with the element sequence as a detected sent sequence.

With reference to the second aspect, in a first possible implementation of the second aspect, the detection module is further configured to set i to an integer from 1 to N sequentially, and separately perform the following on an $i^{th}$ element. Making a hard decision on the $i^{th}$ element to obtain a decision value of the $i^{th}$ element, where the $i^{th}$ element is an element in the N elements, obtaining a first Euclidean distance between an I component of the $i^{th}$ element and an I component of the decision value of the $i^{th}$ element through computation according to the $i^{th}$ element and the decision value of the $i^{th}$ element, and determining the I component of the decision value of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

With reference to the first possible implementation of the second aspect, in a second possible implementation of the second aspect, the detection module is further configured to obtain a second Euclidean distance between a Q component of the $i^{th}$ element and a Q component of the decision value of the $i^{th}$ element through computation after determining the I component of the decision value of the $i^{th}$ element as the possible value of the I component of the $i^{th}$ element or setting the I component value of the one or two constellation points closest to the I component of the $i^{th}$ element as the possible value of the I component of the $i^{th}$ element, and determine the Q component of the decision value of the $i^{th}$ element as a possible value of the Q component of the $i^{th}$ element when the second Euclidean distance is less than or equal to a second threshold, or set, according to the constellation, a Q component value of one or two constellation points closest to the Q component of the $i^{th}$ element as a possible value of the Q component of the $i^{th}$ element when the second Euclidean distance is greater than the second threshold.

With reference to the second aspect, in a third possible implementation of the second aspect, the detection module is further configured to set i to an integer from 1 to N sequentially, and separately perform the following on an $i^{th}$ element. Making a hard decision on an I component and a Q component of the $i^{th}$ element to obtain a decision value of the I component of the $i^{th}$ element and a decision value of the Q component of the $i^{th}$ element, where the $i^{th}$ element is an element in the N elements, obtaining a first Euclidean distance between the I component of the $i^{th}$ element and the decision value of the I component of the $i^{th}$ element through computation, and determining the decision value of the I component of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

With reference to the third possible implementation of the second aspect, in a fourth possible implementation of the second aspect, the detection module is further configured to obtain a second Euclidean distance between a Q component of the $i^{th}$ element and a decision value of the Q component of the $i^{th}$ element through computation after determining the decision value of the I component of the $i^{th}$ element as the possible value of the I component of the $i^{th}$ element or setting the I component value of the one or two constellation points closest to the I component of the $i^{th}$ element as the possible value of the I component of the $i^{th}$ element, and determine the decision value of the Q component of the $i^{th}$ element as a possible value of the Q component of the $i^{th}$ element when the second Euclidean distance is less than or equal to a second threshold, or set, according to the constellation, a Q component value of one or two constellation points closest to the Q component of the $i^{th}$ element as a possible value of the Q component of the $i^{th}$ element when the second Euclidean distance is greater than the second threshold.

With reference to the second possible implementation of the second aspect or the fourth possible implementation of the second aspect, in a fifth possible implementation of the second aspect, the detection module is further configured to combine the possible value of the I component of the $i^{th}$ element and the possible value of the Q component of the $i^{th}$ element to obtain a maximum possible candidate value of the $i^{th}$ element, and obtain the N maximum possible candidate values.

According to a third aspect of this application, a receiving device is provided and includes a receiver configured to receive an element sequence, a memory configured to store an instruction, where the instruction includes determining a maximum possible candidate value of each element in N elements of the received element sequence to obtain N maximum possible candidate values, where N is a positive integer, determining state sequences corresponding to the N maximum possible candidate values as reserved sequences to obtain N groups of reserved sequences, performing likelihood computation on the N groups of reserved sequences, and setting a reserved sequence that is in the N groups of reserved sequences and is most consistent with the element sequence as a detected sent sequence, and a processor configured to execute the instruction.

With reference to the third aspect, in a first possible implementation of the third aspect, the instruction further includes setting i to an integer from 1 to N sequentially, and separately performing the following on an $i^{th}$ element. Making a hard decision on the $i^{th}$ element to obtain a decision value of the $i^{th}$ element, where the $i^{th}$ element is an element in the N elements, obtaining a first Euclidean distance between an I component of the $i^{th}$ element and an I component of the decision value of the $i^{th}$ element through computation according to the $i^{th}$ element and the decision value of the $i^{th}$ element, and determining the I component of the decision value of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

With reference to the first possible implementation of the third aspect, in a second possible implementation of the third aspect, the instruction further includes obtaining a second Euclidean distance between a Q component of the $i^{th}$ element and a Q component of the decision value of the $i^{th}$ element through computation after determining the I component of the decision value of the $i^{th}$ element as the possible value of the I component of the $i^{th}$ element or setting the I component value of the one or two constellation points closest to the I component of the $i^{th}$ element as the possible value of the I component of the $i^{th}$ element, and determining the Q component of the decision value of the $i^{th}$ element as a possible value of the Q component of the $i^{th}$ element when the second Euclidean distance is less than or equal to a second threshold, or setting, according to the constellation, a Q component value of one or two constellation points closest to the Q component of the $i^{th}$ element as a possible value of the Q component of the $i^{th}$ element when the second Euclidean distance is greater than the second threshold.

With reference to the third aspect, in a third possible implementation of the third aspect, the instruction further includes setting i to an integer from 1 to N sequentially, and separately performing the following on an $i^{th}$ element. Making a hard decision on an I component and a Q component of the $i^{th}$ element to obtain a decision value of the I component of the $i^{th}$ element and a decision value of the Q component of the $i^{th}$ element, where the $i^{th}$ element is an element in the N elements, obtaining a first Euclidean distance between the I component of the $i^{th}$ element and the decision value of the I component of the $i^{th}$ element through computation, and determining the decision value of the I component of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

With reference to the third possible implementation of the third aspect, in a fourth possible implementation of the third aspect, the instruction further includes obtaining a second Euclidean distance between a Q component of the $i^{th}$ element and a decision value of the Q component of the $i^{th}$ element through computation after determining the decision value of the I component of the $i^{th}$ element as the possible value of the I component of the $i^{th}$ element or setting the I component value of the one or two constellation points closest to the I component of the $i^{th}$ element as the possible value of the I component of the $i^{th}$ element, and determining the decision value of the Q component of the $i^{th}$ element as a possible value of the Q component of the $i^{th}$ element when the second Euclidean distance is less than or equal to a second threshold, or setting, according to the constellation, a Q component value of one or two constellation points closest to the Q component of the $i^{th}$ element as a possible value of the Q component of the $i^{th}$ element when the second Euclidean distance is greater than the second threshold.

One or more technical solutions provided in embodiments of the present disclosure have at least the following technical effects or advantages.

In the embodiments of the present disclosure, a maximum possible candidate value of each element in N elements of a received element sequence is determined such that N maximum possible candidate values are obtained, where N is a positive integer. State sequences corresponding to the N maximum possible candidate values are determined as reserved sequences such that N groups of reserved sequences are obtained, and likelihood computation is performed on the N groups of reserved sequences, and a reserved sequence that is in the N groups of reserved sequences and is most consistent with the element sequence is used as a detected sent sequence. Therefore, screening is first performed on each element of the received element sequence, and a maximum possible candidate value is obtained from possible candidate values of each element. Finally, likelihood computation is performed only on a reserved state corresponding to the maximum possible candidate value, and thereby the sent sequence is determined. However, computation is not performed on a state sequence corresponding to a non-maximum possible candidate value. It can be learned that, in comparison with the other approaches, a quantity of operations in the technical solutions provided by the embodiments of the present disclosure is reduced, and therefore, efficiency of detecting a sent sequence is improved.

DESCRIPTION OF EMBODIMENTS

The present disclosure provides a method for detecting a sent sequence, a receiver, and a receiving device in order to simplify an algorithm for detecting a sent sequence and improve detection efficiency.

To resolve the foregoing technical problem, in the technical solutions of the embodiments of the present disclosure, the method for detecting a sent sequence in the present disclosure includes the following content.

In the embodiments of the present disclosure, a maximum possible candidate value of each element in N elements of a received element sequence is determined such that N maximum possible candidate values are obtained, where N is a positive integer, state sequences corresponding to the N maximum possible candidate values are determined as reserved sequences such that N groups of reserved sequences are obtained, and likelihood computation is performed on the N groups of reserved sequences, and a reserved sequence that is in the N groups of reserved sequences and is most consistent with the element sequence is used as a detected sent sequence. Therefore, screening is first performed on each element of the received element sequence, and a maximum possible candidate value is obtained from possible candidate values of each element. Finally, likelihood computation is performed only on a reserved state corresponding to the maximum possible candidate value, and thereby the sent sequence is determined. However, computation is not performed on a state sequence corresponding to a non-maximum possible candidate value. It can be learned that, in comparison with the other approaches, a quantity of operations in the technical solutions provided by the embodiments of the present disclosure is reduced, and therefore, efficiency of detecting a sent sequence is improved.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

The following describes the implementations of the present disclosure in detail with reference to accompanying drawings.

Figure 1:
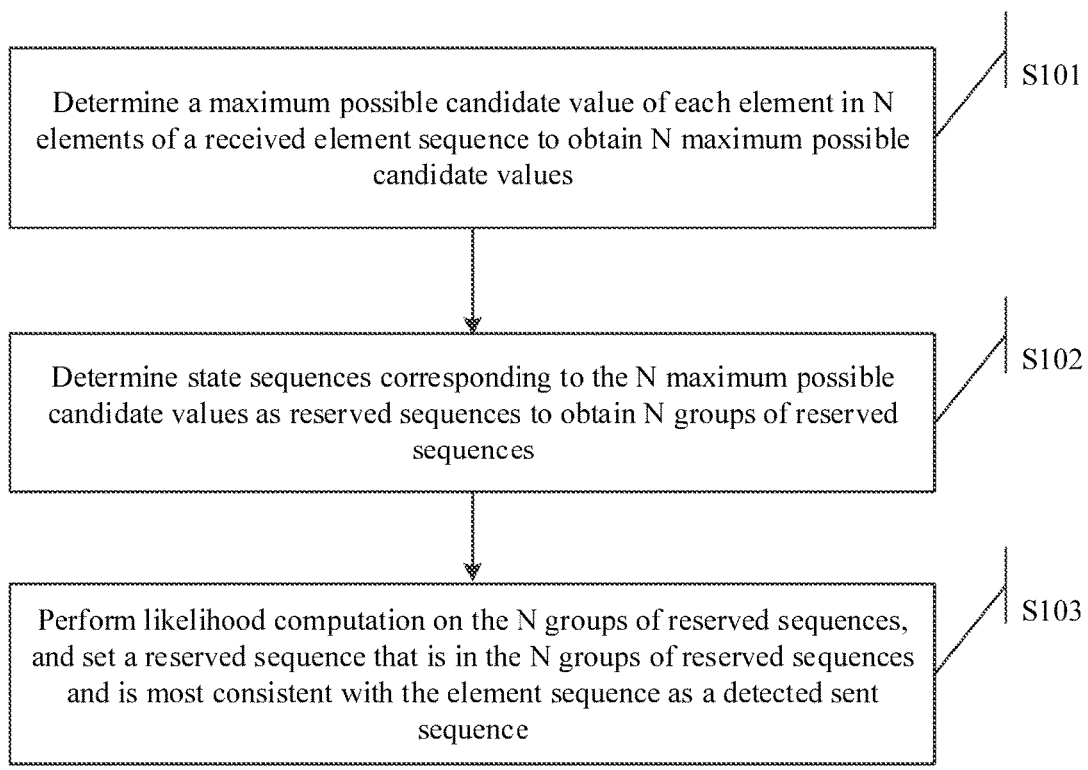
FIG. 1 is a flowchart of a method for detecting a sent sequence according to an embodiment of the present disclosure.

According to a first aspect of this application, a method for detecting a sent sequence is provided. Referring to FIG. 1, the method includes the following steps.

Step S101: Determine a maximum possible candidate value of each element in N elements of a received element sequence to obtain N maximum possible candidate values.

Step S102: Determine state sequences corresponding to the N maximum possible candidate values as reserved sequences to obtain N groups of reserved sequences.

Step S103: Perform likelihood computation on the N groups of reserved sequences, and set a reserved sequence that is in the N groups of reserved sequences and is most consistent with the element sequence as a detected sent sequence.

Figure 2:
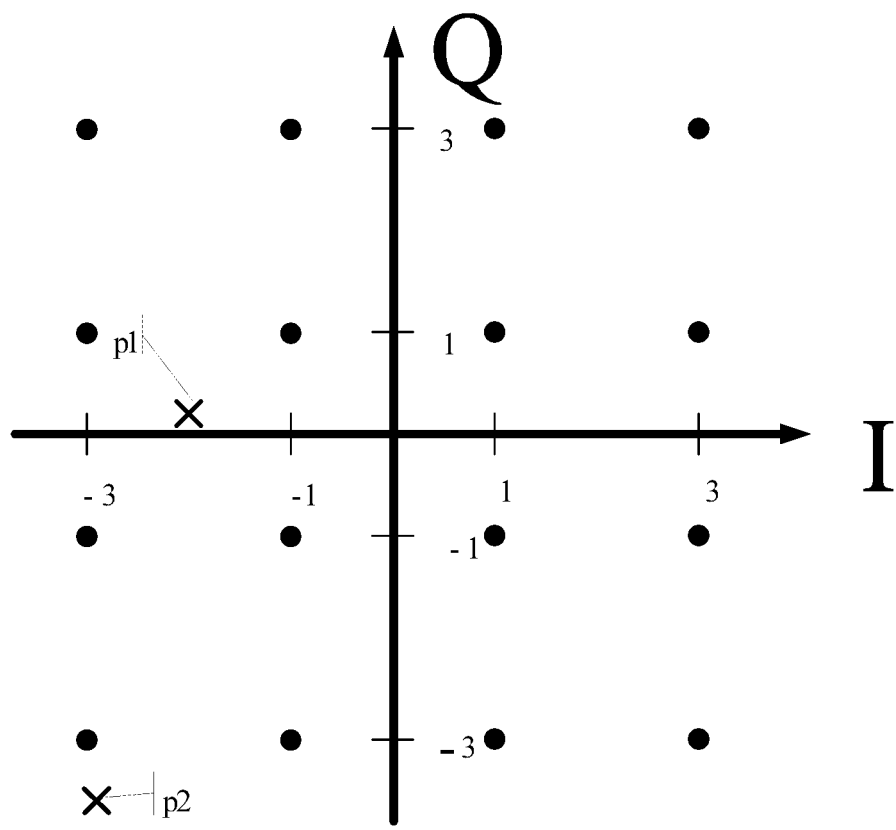
FIG. 2 is a schematic diagram of a 16QAM constellation and constellation points of two original elements according to an embodiment of the present disclosure.

Further, in the technical field of this application, the element sequence includes N elements, where N is a positive integer, for example, 1, 30, or 392. Each element includes two components, namely, an I component and a Q component, represented in a form of a complex number. For example, if an element a1 in the form of a complex number is −3+1j, an I component of the element a1 is −3, and a Q component is 1. However, for each element, there are finite possible values of the I component and possible values of the Q component. For example, in a 16QAM system, there are only four values, −3, −1, 1, and 3. Therefore, a quantity of candidate values of an element is finite. For example, there are 16 values in total in 16QAM. As shown in FIG. 2, in a constellation, 16 candidate values of an element are shown by 16 black points in FIG. 2. For another example, in 8 QAM, each element has eight candidate values. Because the candidate values of each element in the 16QAM and 8 QAM systems are well-known, multiple candidate values of each element are not illustrated one by one herein.

Therefore, for any element in the element sequence, during sending at a transmit end, an actually sent value has only several finite possibilities. In the several finite possibilities, a probability of each candidate value is not necessarily the same.

To reduce a quantity of operations of an MLSE-VA algorithm, in step S101, the maximum possible candidate value of each element in the N elements of the element sequence is first determined. In an embodiment of the present disclosure, two manners of determining a maximum possible candidate value from multiple candidate values of an element are described in detail. A specific implementation process includes but is not limited to the following two manners.

First Manner:

Because the element sequence includes multiple elements, and processing manners of all elements are similar, for ease of description, the following uses an $i^{th}$ element as an example for description. In the first manner, step S101 further includes the following steps.

Step (11): Make a hard decision on the $i^{th}$ element to obtain a decision value of the $i^{th}$ element.

Step (12): Obtain a first Euclidean distance between an I component of the $i^{th}$ element and an I component of the decision value of the $i^{th}$ element through computation according to the $i^{th}$ element and the decision value of the $i^{th}$ element.

Step (13): Determine the I component of the decision value of the $i^{th}$ element as a possible value of the I component of the $i^{th}$ element when the first Euclidean distance is less than or equal to a first threshold, or set, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold.

Step (14): Obtain a second Euclidean distance between a Q component of the $i^{th}$ element and a Q component of the decision value of the $i^{th}$ element through computation.

Step (15): Determine the Q component of the decision value of the $i^{th}$ element as a possible value of the Q component of the $i^{th}$ element when the second Euclidean distance is less than or equal to a second threshold, or set, according to the constellation, a Q component value of one or two constellation points closest to the Q component of the $i^{th}$ element as a possible value of the Q component of the $i^{th}$ element when the second Euclidean distance is greater than the second threshold.

In order to determine a maximum possible candidate value of the $i^{th}$ element of the element sequence, in step (11), first, a hard decision is made on the $i^{th}$ element. In this embodiment of the present disclosure, the hard decision is to determine a value of a constellation point closest to a constellation point of an original element in the constellation. For ease of description, the following uses a receiver in the 16QAM system as an example for description. Assuming that an original constellation point p1 of the $i^{th}$ element is (−2, 0.2), a location of the point p1 is shown in FIG. 2. Through computation, p1 is closest to a point (−1, 1) in the constellation, and therefore, a decision value of the point p1 is −1+1j.

In this embodiment of the present disclosure, the foregoing process of obtaining the decision value of the $i^{th}$ element includes computing the Euclidean distance between the original constellation point of the $i^{th}$ element and each constellation point. A closest constellation point is a constellation point closest to the original constellation point of the element, and a value of the closest constellation point is the decision value of the $i^{th}$ element.

Next, in step (12), the first Euclidean distance between the I component of the $i^{th}$ element and the I component of the decision value of the $i^{th}$ element is obtained according to the $i^{th}$ element and the decision value of the $i^{th}$ element. In this embodiment of the present disclosure, the first Euclidean distance is also computed using the Euclidean distance algorithm. For example, the first Euclidean distance between the I component of the point p1 and the I component of the decision value is:

$$\sqrt{[-2-(-1)]^2} = 1.$$

Then in step (13), it is necessary to compare the first Euclidean distance with the first threshold. The first threshold is a positive number, for example, 1, 0.5, or 0.7. The first threshold may be set according to complexity of the algorithm and a performance requirement. For example, precision of detecting a sent sequence according to the first threshold 0.5 is higher than precision of detection when the first threshold is 1. A person of ordinary skill in the art may perform setting according to an actual requirement, and this is not limited in this application.

When the first Euclidean distance is less than or equal to the first threshold, the I component of the decision value of the $i^{th}$ element is determined as a possible value of the I component of the $i^{th}$ element. However, when the first Euclidean distance is greater than the first threshold, an I component of one or two constellation points closest to the I component of the $i^{th}$ element in the 16 constellation points in the constellation is used as a possible value of the I component of the element.

Figure 3:
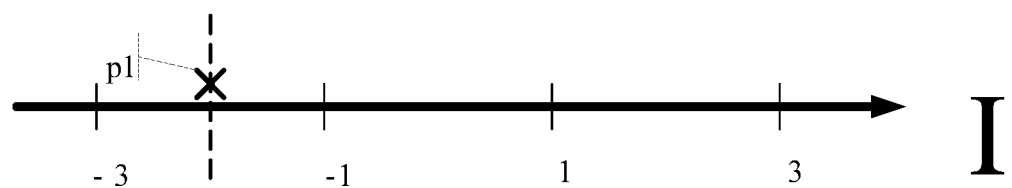
FIG. 3 is a schematic diagram of a constellation point and an I-axis according to an embodiment of the present disclosure.

Still using the foregoing example for description, assuming that the first threshold in this case is 0.7, the first Euclidean distance is greater than the first threshold. In this case, the I component of one or two constellation points closest to the I component of p1 in the 16 constellation points in the constellation is used as a possible value of the I component of p1. As shown in FIG. 2 and FIG. 3, the I component of the point p1 is −2, and p1 is between −1 and −3 in an I-axis direction, and is one unit length away from both −1 and −3. Therefore, −1+1j and −3+1j are two constellation points closest to the I component of the point p1. In this case, I components of −1+1j and −3+1j are used as possible values of the I component of the point p1. Therefore, possible values of the I component of the point p1 are −1 and −3.

The constellation includes multiple constellation points. For example, 8 QAM includes eight constellation points, and 16QAM includes 16 constellation points. Each constellation point represents a possible candidate value of the $i^{th}$ element.

The step (14) is performed to obtain the second Euclidean distance between the Q component of the $i^{th}$ element and the Q component of the decision value of the $i^{th}$ element. In this embodiment of the present disclosure, the second Euclidean distance is similar to the first Euclidean distance, and is also computed using the Euclidean distance algorithm. For example, the second Euclidean distance between the Q component of the point p1 and the Q component of the decision value is:

$$\sqrt{(0.2-1)^2} = 0.8.$$

Then in step (15), it is necessary to compare the second Euclidean distance with the second threshold. The second threshold is also a positive number, for example, 1, 0.5, or 0.7. The second threshold may also be set according to complexity of the algorithm and a performance requirement. In addition, in a specific implementation process, the second threshold and the first threshold may be set to a same value, or may be set to different values. This is not limited in this application.

Similar to processing of the I component of the $i^{th}$ element, when the second Euclidean distance is less than or equal to the second threshold, the Q component of the decision value of the $i^{th}$ element is determined as a possible value of the Q component of the $i^{th}$ element. However, when the second Euclidean distance is greater than the second threshold, a Q component of one or two constellation points closest to the Q component of the $i^{th}$ element in the 16 constellation points in the constellation is used as a possible value of the Q component of the $i^{th}$ element.

Still using the foregoing example for description, assuming that both the second threshold and the first threshold in this case are 0.7, the second Euclidean distance is greater than the second threshold. As shown in FIG. 2, −1+1j, −3+1j, −1−1j, and −3−1j are four constellation points closest to the Q component of the point p1. In this case, Q components of the four constellation points are used as possible values of the Q component of the point p1. Therefore, possible values of the Q component of the point p1 are 1 and −1.

When the first Euclidean distance is greater than the first threshold, and the I component of the $i^{th}$ element is less than or equal to a minimum value on an I-axis of the constellation or is greater than or equal to a maximum value on the I-axis, in this case, the I component of the $i^{th}$ element is only close to a constellation point with the maximum value or the minimum value on the I-axis, and therefore, there is only one possible value of the I component of the $i^{th}$ element. However, when the I component of the $i^{th}$ element is between two values on the I-axis, there are two possible values of the I component of the $i^{th}$ element. However, when the first Euclidean distance is less than or equal to the first threshold, the possible value of the I component of the $i^{th}$ element may be only a decision value of the I component or the I component of the decision value. The possible value of the Q component of the $i^{th}$ element is similar to this. Therefore, a quantity of possible values of the I component of the $i^{th}$ element or possible values of the Q component of the $i^{th}$ element is 1 or 2.

In a specific implementation process, steps (12) to (13) may be first performed and then steps (14) to (15) are performed, that is, first, the possible value of the I component is obtained, and then the possible value of the Q component is obtained. Alternatively, steps (14) to (15) may be first performed and then steps (12) to (13) are performed, that is, first, the possible value of the Q component is obtained, and then the possible value of the I component is obtained. Alternatively, steps (14) to (15) and steps (12) to (13) may be performed simultaneously, and possible values of the two components are obtained simultaneously. A person skilled in the art can make a selection according to an actual requirement, and this is not limited in this application.

Second Manner:

In the second manner, step S101 further includes the following steps.

Step (21): Make a hard decision on an I component and a Q component of the $i^{th}$ element to obtain a decision value of the I component of the $i^{th}$ element and a decision value of the Q component of the $i^{th}$ element.

Step (22): Obtain a first Euclidean distance between the I component of the $i^{th}$ element and the decision value of the I component of the $i^{th}$ element through computation.

Step (23): Determine the decision value of the I component of the $i^{th}$ element as a possible value of the I component of the $i^{th}$ element when the first Euclidean distance is less than or equal to a first threshold, or set, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

Step (24): Obtain a second Euclidean distance between a Q component of the $i^{th}$ element and a decision value of the Q component of the $i^{th}$ element through computation.

Step (25): Determine the decision value of the Q component of the $i^{th}$ element as a possible value of the Q component of the $i^{th}$ element when the second Euclidean distance is less than or equal to a second threshold, or set, according to the constellation, a Q component value of one or two constellation points closest to the Q component of the $i^{th}$ element as a possible value of the Q component of the $i^{th}$ element when the second Euclidean distance is greater than the second threshold.

In order to determine a maximum possible candidate value of the $i^{th}$ element of the element sequence, in step (21), first, a hard decision is made on the I component and the Q component of the $i^{th}$ element. Similar to the first manner, the hard decision is to determine a constellation point closest to a constellation point of an original element in the constellation. A difference lies in that, only a distance between constellation points in an I-axis direction is considered when the I component of the $i^{th}$ element is decided, and only a distance between constellation points in a Q-axis direction is considered when the Q component of the $i^{th}$ element is decided. It is assumed that a location of an original constellation point p2 (−2.88, −3.6) of the $i^{th}$ element is shown in FIG. 2. −2.88 is closest to −3 in the I-axis direction, and therefore, a decision value of the I component of the point p2 is −3. Likewise, −3.6 is closest to −3 in the Q-axis direction, and therefore, a decision value of the Q component of the point p2 is also −3.

Next, the first Euclidean distance between the decision value of the I component of the $i^{th}$ element and the I component of the $i^{th}$ element is obtained:

$$\sqrt{[-2.99-(-3)]^2}=0.12, \text{ and}$$

the second Euclidean distance between the decision value of the Q component of the $i^{th}$ element and the Q component of the $i^{th}$ element is obtained:

$$\sqrt{[-3.6-(-3)]^2}=0.6.$$

Next, similar to the first manner, the second manner is to determine the possible value of the I component of the $i^{th}$ element and the possible value of the Q component by comparing the first Euclidean distance with the first threshold and comparing the second Euclidean distance with the second threshold. For a detailed description, reference may be made to the first manner. Details are not described again herein.

The example in which p2 is −2.88−3.6j is still used for description. Assuming that the first threshold in this case is 0.5, and that the second threshold is 0.7, the first Euclidean distance is less than the first threshold, and the second Euclidean distance is also less than the second threshold. Therefore, the possible value of the I component of the element p2 and the possible value of the Q component are both −3.

In a specific implementation process, the first manner may be used to obtain possible values of the two components, or the second manner may be used to obtain possible values of the two components. A person of ordinary skill in the art may perform setting according to an actual requirement, and this is not limited in this application.

Further, in this embodiment of the present disclosure, after the possible values of the two components are obtained, step S101 further includes combining the possible value of the I component of the $i^{th}$ element and the possible value of the Q component of the $i^{th}$ element to obtain a maximum possible candidate value of the $i^{th}$ element, and obtaining the N maximum possible candidate values.

Further, an original element is represented in the form of a complex number. Therefore, after the possible value of the I component of the $i^{th}$ element and the possible value of the Q component of the $i^{th}$ element are obtained, the values are combined still in the form of a complex number, and the maximum possible candidate value of the $i^{th}$ element may be obtained, and further, the maximum possible candidate values of the N elements are obtained.

Still using the foregoing example for description, an original value of the element p1 is −2+0.2j, possible values of the I component are −1 and −3, and possible values of the Q component are 1 and −1. Therefore, the element p1 has four maximum possible candidate values, which are −1+1j, −1−1j, −3+1j, and −3−1j respectively.

An original value of the element p2 is −2.88−3.6j, a possible value of the I component is −3, and a possible value of the Q component is −3. Therefore, the element p1 has only one maximum possible candidate value, namely, −3−3j.

In this embodiment of the present disclosure, if possible values of the two components are both decision values of corresponding components or components of decision values, after the possible values of the two components are combined, the $i^{th}$ element has only one maximum possible candidate value. If a possible value of one component is a decision value, but a possible value of the other component is a component value of a constellation point closest to the component of the $i^{th}$ element, after the possible values of the two components are combined, the $i^{th}$ element also has only one maximum possible candidate value.

When a possible value of one component of the $i^{th}$ element is a decision value or a component value of a closest constellation point, but possible values of the other component are component values of two closest constellation points, after the possible values of the two components are combined, the $i^{th}$ element has two maximum possible candidate values.

When a possible value of one component of the $i^{th}$ element is a decision value or a component value of a closest constellation point, but possible values of the other component are component values of three closest constellation points (for example, a receiver in the 8 QAM system), after the possible values of the two components are combined, the $i^{th}$ element has three maximum possible candidate values.

Finally, when the two components both have two possible values, after the possible values of the two components are combined, the $i^{th}$ element has four maximum possible candidate values.

After the maximum possible candidate value of each element is obtained, the N maximum possible candidate values may be further obtained.

Next, in step S102, the state sequences corresponding to the N maximum possible candidate values are determined as reserved sequences, and the N groups of reserved sequences are further obtained. Further, each element has multiple possible values, for example, in 16QAM, each element has 16 possible values, and each value may correspond to multiple states. Therefore, possible values of all elements correspond to a large quantity of states. In this embodiment of the present disclosure in order to reduce a quantity of operations of MLSE-VA, only state sequences corresponding to the N maximum possible candidate values are reserved as reserved sequences, but state sequences corresponding to non-maximum possible candidate values are not processed any longer in subsequent computation.

For example, for the element sequence including the element p1, step S101 is performed to obtain the maximum possible candidate value of p1, −1+1j, −1−1j, −3+1j, or −3−1j. In step S102, only a state sequence corresponding to −1+1j, −1−1j, −3+1j, or −3−1j is reserved as a reserved sequence. However, all state sequences corresponding to other possible values of p1, namely, −3+3j, −1+3j, 3+3j, 1+1j, 3+1j, 1−1, 3−1, −3−j, −1−3j, −1−3j, and 3+3j, are deleted, and are no longer considered or computed subsequently.

In addition to the element p1, the element sequence further includes other elements. The foregoing processing is performed on each element, and only a state sequence corresponding to the maximum possible candidate value of each element is reserved as a reserved sequence. Therefore, after such processing, likelihood computation is performed on only the reserved sequence in step S103. Therefore, in comparison with the other approaches in which likelihood computation is performed on all state sequences, a quantity of operations is reduced.

In step S103, likelihood computation is performed on the N groups of reserved sequences to obtain likelihood between the reserved sequences and the element sequence. Finally, in the N groups of reserved sequences, according to the likelihood between each group of reserved sequences and the element sequence, a group of reserved sequences having maximum likelihood with the element sequence is used as the detected sent sequence.

A specific process of performing likelihood computation in step S103 is similar to that in the other approaches, and is not described herein.

Further, when likelihood computation is performed in step S103 in order to reduce impact caused by an error of the decision value in step S101 on a result, a likelihood result further needs to be multiplied by a corresponding weighting factor. Further, the weighting factor is determined according to the first Euclidean distance and the second Euclidean distance. The weighting factor is smaller when the first Euclidean distance and the second Euclidean distance are greater. The weighting factor is greater when the first Euclidean distance and the second Euclidean distance are smaller. For example, for the foregoing element p1, when the first Euclidean distance is 1, and the second Euclidean distance does not exceed 0.8, both 1 and 0.8 are large. Therefore, a likelihood result of a reserved state corresponding to the maximum possible candidate value of the element p1 may be multiplied by a small weighting factor such as 0.1 or 0.2. The first Euclidean distance and the second Euclidean distance of the element p2 are 0.12 and 0.6, and are relatively small, and therefore, 0.5, 0.8, 1, or the like may be selected as a corresponding weighting factor.

In a specific implementation process, a person skilled in the art may set the weighting factor according to a preset rule. For example, for the Euclidean distance in a range from 0 to 1, the weighting factor is set to 1. For the Euclidean distance between 1 and 3, the weighting factor is set to 0.5. For the Euclidean distance between 3 and 6, the weighting factor is set to 0.1. For the Euclidean distance of 6, the weighting factor is set to 0.01, and so on. This is not limited in this application.

Figure 4:
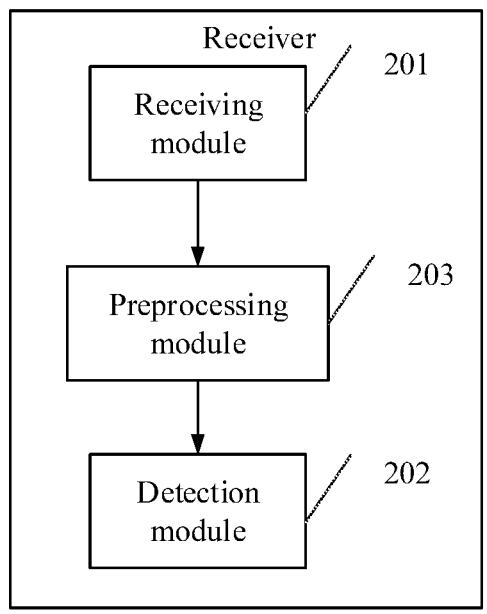
FIG. 4 is a schematic structural diagram of a receiver according to an embodiment of the present disclosure.

According to a second aspect of this application, a receiver is provided, and as shown in FIG. 4, includes a receiving module 201 configured to receive an element sequence, and a detection module 202, connected to the receiving module 201, and configured to determine a maximum possible candidate value of each element in N elements of the element sequence to obtain N maximum possible candidate values, determine state sequences corresponding to the N maximum possible candidate values as reserved sequences to obtain N groups of reserved sequences, and perform likelihood computation on the N groups of reserved sequences, and set a reserved sequence that is in the N groups of reserved sequences and is most consistent with the element sequence as a detected sent sequence.

In this embodiment of the present disclosure, the receiver may further include a preprocessing module 203. The receiving module 201 is connected to the detection module 202 by the preprocessing module 203. The preprocessing module 203 is configured to perform preprocessing on the element sequence, including but not limited to digital-to-analog conversion, equalization processing, filtering, and the like.

In this embodiment of the present disclosure, there are two implementations of obtaining the N maximum possible candidate values. The detection module 202 may also have two implementations.

In the first manner, the detection module 202 is configured to set i to an integer from 1 to N sequentially, and separately perform the following on an $i^{th}$ element. Making a hard decision on the $i^{th}$ element to obtain a decision value of the $i^{th}$ element, where the $i^{th}$ element is an element in the N elements, obtaining a first Euclidean distance between an I component of the $i^{th}$ element and an I component of the decision value of the $i^{th}$ element through computation according to the $i^{th}$ element and the decision value of the $i^{th}$ element, and determining the I component of the decision value of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

The detection module 202 is further configured to obtain a second Euclidean distance between a Q component of the $i^{th}$ element and a Q component of the decision value of the $i^{th}$ element through computation after determining the I component of the decision value of the $i^{th}$ element as the possible value of the I component of the $i^{th}$ element or using the I component value of the one or two constellation points closest to the I component of the $i^{th}$ element as the possible value of the I component of the $i^{th}$ element, and determine the Q component of the decision value of the $i^{th}$ element as a possible value of the Q component of the $i^{th}$ element when the second Euclidean distance is less than or equal to a second threshold, or set, according to the constellation, a Q component value of one or two constellation points closest to the Q component of the $i^{th}$ element as a possible value of the Q component of the $i^{th}$ element when the second Euclidean distance is greater than the second threshold.

In the second manner, the detection module 202 is further configured to set i to an integer from 1 to N sequentially, and separately perform the following on an $i^{th}$ element. Making a hard decision on an I component and a Q component of the $i^{th}$ element to obtain a decision value of the I component of the $i^{th}$ element and a decision value of the Q component of the $i^{th}$ element, where the $i^{th}$ element is an element in the N elements, obtaining a first Euclidean distance between the I component of the $i^{th}$ element and the decision value of the I component of the $i^{th}$ element through computation, and determining the decision value of the I component of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

Further, the detection module 202 is further configured to obtain a second Euclidean distance between a Q component of the $i^{th}$ element and a decision value of the Q component of the $i^{th}$ element through computation after determining the decision value of the I component of the $i^{th}$ element as the possible value of the I component of the $i^{th}$ element or setting the I component value of the one or two constellation points closest to the I component of the $i^{th}$ element as the possible value of the I component of the $i^{th}$ element, and determine the decision value of the Q component of the $i^{th}$ element as a possible value of the Q component of the $i^{th}$ element when the second Euclidean distance is less than or equal to a second threshold, or set, according to the constellation, a Q component value of one or two constellation points closest to the Q component of the $i^{th}$ element as a possible value of the Q component of the $i^{th}$ element when the second Euclidean distance is greater than the second threshold.

Optionally, regardless of which implementation is used to process the $i^{th}$ element, the detection module 202 is further configured to combine the possible value of the I component of the $i^{th}$ element and the possible value of the Q component of the $i^{th}$ element to obtain a maximum possible candidate value of the $i^{th}$ element, and obtain the N maximum possible candidate values.

Figure 5:
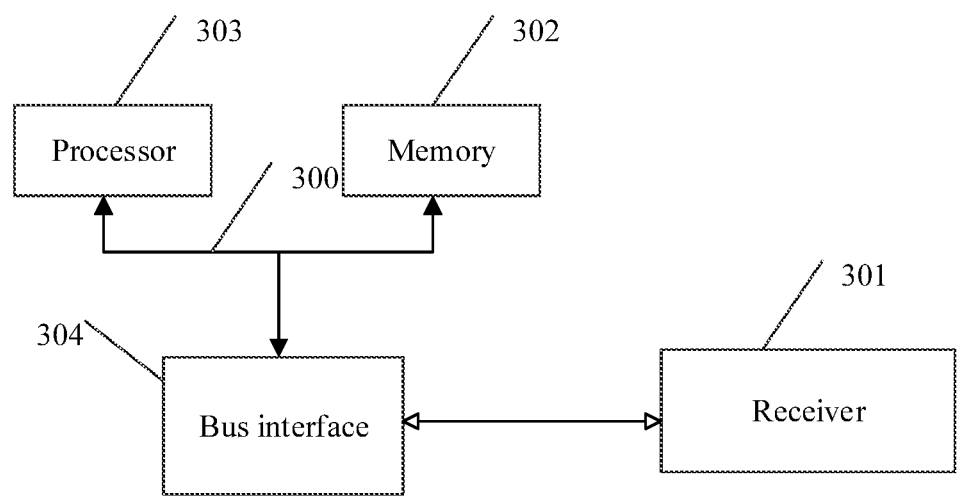
FIG. 5 is a schematic structural diagram of a receiving device according to an embodiment of the present disclosure.

According to a third aspect of this application, a receiving device is provided, and as shown in FIG. 5, includes a receiver 301 configured to receive an element sequence, a memory 302 configured to store an instruction, where the instruction includes determining a maximum possible candidate value of each element in N elements of the received element sequence to obtain N maximum possible candidate values, where N is a positive integer, determining state sequences corresponding to the N maximum possible candidate values as reserved sequences to obtain N groups of reserved sequences, performing likelihood computation on the N groups of reserved sequences, and setting a reserved sequence that is in the N groups of reserved sequences and is most consistent with the element sequence as a detected sent sequence, and a processor 303 configured to execute the instruction.

Optionally, the instruction further includes setting i to an integer from 1 to N sequentially, and separately performing the following on an $i^{th}$ element. Making a hard decision on the $i^{th}$ element to obtain a decision value of the $i^{th}$ element, where the $i^{th}$ element is an element in the N elements, obtaining a first Euclidean distance between an I component of the $i^{th}$ element and an I component of the decision value of the $i^{th}$ element through computation according to the $i^{th}$ element and the decision value of the $i^{th}$ element, and determining the I component of the decision value of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

The instruction further includes obtaining a second Euclidean distance between a Q component of the $i^{th}$ element and a Q component of the decision value of the $i^{th}$ element through computation after determining the I component of the decision value of the $i^{th}$ element as the possible value of the I component of the $i^{th}$ element or using the I component value of the one or two constellation points closest to the I component of the $i^{th}$ element as the possible value of the I component of the $i^{th}$ element, and determining the Q component of the decision value of the $i^{th}$ element as a possible value of the Q component of the $i^{th}$ element when the second Euclidean distance is less than or equal to a second threshold, or setting, according to the constellation, a Q component value of one or two constellation points closest to the Q component of the $i^{th}$ element as a possible value of the Q component of the $i^{th}$ element when the second Euclidean distance is greater than the second threshold.

Optionally, the instruction includes setting i to an integer from 1 to N sequentially, and separately performing the following on an $i^{th}$ element. Making a hard decision on an I component and a Q component of the $i^{th}$ element to obtain a decision value of the I component of the $i^{th}$ element and a decision value of the Q component of the $i^{th}$ element, where the $i^{th}$ element is an element in the N elements, obtaining a first Euclidean distance between the I component of the $i^{th}$ element and the decision value of the I component of the $i^{th}$ element through computation, and determining the decision value of the I component of the $i^{th}$ element as a possible value of the I component of the $i^{th}$ element when the first Euclidean distance is less than or equal to a first threshold, or setting, according to a constellation corresponding to the $i^{th}$ element, an I component value of one or two constellation points closest to the I component of the $i^{th}$ element as a possible value of the I component of the $i^{th}$ element when the first Euclidean distance is greater than the first threshold, where there are multiple constellation points in the constellation, and each constellation point represents a possible candidate value of the $i^{th}$ element.

The instruction further includes obtaining a second Euclidean distance between a Q component of the $i^{th}$ element and a decision value of the Q component of the $i^{th}$ element through computation after determining the decision value of the I component of the $i^{th}$ element as the possible value of the I component of the $i^{th}$ element or using the I component value of the one or two constellation points closest to the I component of the $i^{th}$ element as the possible value of the I component of the $i^{th}$ element, and determining the decision value of the Q component of the $i^{th}$ element as a possible value of the Q component of the $i^{th}$ element when the second Euclidean distance is less than or equal to a second threshold, or setting, according to the constellation, a Q component value of one or two constellation points closest to the Q component of the $i^{th}$ element as a possible value of the Q component of the $i^{th}$ element when the second Euclidean distance is greater than the second threshold.

In FIG. 5, for a bus architecture (represented by a bus 300), the bus 300 may include any quantity of interconnecting buses and bridges, and the bus 300 interconnects various circuits of one or more processors represented by the processor 303 and a memory represented by the memory 302. A bus interface 304 provides an interface between the bus 300 and the receiver 301. The bus 300 may further interconnect various other circuits such as a peripheral device, a voltage regulator, and a power management circuit. These are all well known, and therefore are not further described in the specification.

The processor 303 is responsible for managing the bus 300 and general processing. The memory 302 may be configured to store data used when the processor 303 performs an operation.

Various manners and specific examples in the process of detecting a sent sequence in the foregoing embodiments are also applicable to the receiving device in this embodiment. According to the detailed descriptions about the process of detecting a sent sequence and the execution process of the receiver, a person skilled in the art may clearly know the implementation method of the receiving device in this embodiment. Therefore, for brevity of the specification, details are not described again herein.

One or more technical solutions provided in the embodiments of the present disclosure have at least the following technical effects or advantages.

In the embodiments of the present disclosure, a maximum possible candidate value of each element in N elements of a received element sequence is determined such that N maximum possible candidate values are obtained, where N is a positive integer, state sequences corresponding to the N maximum possible candidate values are determined as reserved sequences such that N groups of reserved sequences are obtained, and likelihood computation is performed on the N groups of reserved sequences, and a reserved sequence that is in the N groups of reserved sequences and is most consistent with the element sequence is used as a detected sent sequence. Therefore, screening is first performed on each element of the received element sequence, and a maximum possible candidate value is obtained from possible candidate values of each element. Finally, likelihood computation is performed only on a reserved state corresponding to the maximum possible candidate value, and thereby the sent sequence is determined. However, computation is not performed on a state sequence corresponding to a non-maximum possible candidate value. It can be learned that, in comparison with the other approaches, a quantity of operations in the technical solutions provided by the embodiments of the present disclosure is reduced, and therefore, efficiency of detecting a sent sequence is improved.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for detecting a sent sequence, applied to a receiver, comprising:
   determining a maximum possible candidate value of each element in N elements of a received element sequence to obtain N maximum possible candidate values, N being a positive integer, and the maximum possible candidate value of each element in the N elements of the received element sequence being determined to obtain the N maximum possible candidate values by setting i to an integer from 1 to N sequentially, and separately performing the following on an $i^{th}$ element:
      making a hard decision on the $i^{th}$ element to obtain a decision value of the $i^{th}$ element, the $i^{th}$ element being an element in the N elements;
      obtaining a first Euclidean distance between an I component of the $i^{th}$ element and an I component of the decision value of the $i^{th}$ element through computation according to the $i^{th}$ element and the decision value of the $i^{th}$ element;
      determining the I component of the decision value of the it element as a possible value of the I component of the $i^{th}$ element when the first Euclidean distance is less than or equal to a first threshold; and
      setting, according to a constellation corresponding to the $i^{th}$ element, an I component value of one or two constellation points closest to the I component of the $i^{th}$ element as the possible value of the I component of the $i^{th}$ element when the first Euclidean distance is greater than the first threshold, a plurality of constellation points being in the constellation, and each constellation point representing a possible candidate value of the $i^{th}$ element;
   determining state sequences corresponding to the N maximum possible candidate values as reserved sequences to obtain N groups of reserved sequences;
   performing likelihood computation on the N groups of reserved sequences; and
   setting a reserved sequence that is in the N groups of reserved sequences and is most consistent with the element sequence as a detected sent sequence.

2. The method of claim 1, wherein after determining the I component of the decision value of the $i^{th}$ element as the possible value of the I component of the $i^{th}$ element or after setting the I component value of one or two constellation points closest to the I component of the $i^{th}$ element as the possible value of the I component of the $i^{th}$ element, the method further comprises:
   obtaining a second Euclidean distance between a Q component of the $i^{th}$ element and a Q component of the decision value of the $i^{th}$ element through computation;
   determining the Q component of the decision value of the $i^{th}$ element as a possible value of the Q component of the $i^{th}$ element when the second Euclidean distance is less than or equal to a second threshold; and
   setting, according to the constellation, a Q component value of one or two constellation points closest to the Q component of the $i^{th}$ element as the possible value of the Q component of the $i^{th}$ element when the second Euclidean distance is greater than the second threshold.

3. The method of claim 2, wherein determining the maximum possible candidate value of each element in the N elements of the received element sequence to obtain the N maximum possible candidate values comprises:
   combining the possible value of the I component of the $i^{th}$ element and the possible value of the Q component of the $i^{th}$ element to obtain a maximum possible candidate value of the $i^{th}$ element; and
   obtaining the N maximum possible candidate values.

4. A receiver, comprising:
   a transceiver configured to receive an element sequence; and
   a processor coupled to the transceiver and configured to:
      determine a maximum possible candidate value of each element in N elements of the element sequence to obtain N maximum possible candidate values by setting i to an integer from 1 to N sequentially, and separately performing the following on an $i^{th}$ element:
         make a hard decision on the $i^{th}$ element to obtain a decision value of the $i^{th}$ element, the $i^{th}$ element being an element in the N elements;
         obtain a first Euclidean distance between an I component of the $i^{th}$ element and an I component of the decision value of the $i^{th}$ element through computation according to the $i^{th}$ element and the decision value of the $i^{th}$ element;
         determine the I component of the decision value of the $i^{th}$ element as a possible value of the I component of the $i^{th}$ element when the first Euclidean distance is less than or equal to a first threshold; and
         set, according to a constellation corresponding to the $i^{th}$ element, an I component value of one or two constellation points closest to the I component of the $i^{th}$ element as the possible value of the I component of the $i^{th}$ element when the first Euclidean distance is greater than the first threshold, a plurality of constellation points being in the constellation, and each constellation point representing a possible candidate value of the $i^{th}$ element;
      determine state sequences corresponding to the N maximum possible candidate values as reserved sequences to obtain N groups of reserved sequences;
      perform likelihood computation on the N groups of reserved sequences; and
      set a reserved sequence that is in the N groups of reserved sequences and is most consistent with the element sequence as a detected sent sequence.

5. The receiver of claim 4, wherein the processor is further configured to:
   obtain a second Euclidean distance between a Q component of the $i^{th}$ element and a Q component of the decision value of the $i^{th}$ element through computation after determining the I component of the decision value of the i$^{th}$ element as the possible value of the I component of the i$^{th}$ element or setting the I component value of the one or two constellation points closest to the I component of the i$^{th}$ element as the possible value of the I component of the i$^{th}$ element;
determine the Q component of the decision value of the i$^{th}$ element as a possible value of the Q component of the i$^{th}$ element when the second Euclidean distance is less than or equal to a second threshold; and
set, according to the constellation, a Q component value of one or two constellation points closest to the Q component of the i$^{th}$ element as the possible value of the Q component of the i$^{th}$ element when the second Euclidean distance is greater than the second threshold.

6. The receiver of claim 5, wherein the processor is further configured to:
combine the possible value of the I component of the i$^{th}$ element and the possible value of the Q component of the i$^{th}$ element to obtain a maximum possible candidate value of the i$^{th}$ element; and
obtain the N maximum possible candidate values.

7. A receiving device, comprising:
a receiver configured to receive an element sequence;
a memory coupled to the receiver and configured to store instructions; and
a processor coupled to the receiver and the memory, the instructions causing the processor to be configured to:
determine a maximum possible candidate value of each element in N elements of the received element sequence to obtain N maximum possible candidate values, N being a positive integer, and the maximum possible candidate value of each element in the N elements of the received element sequence being determined to obtain the N maximum possible candidate values by setting i to an integer from 1 to N sequentially, and separately performing the following on an i$^{th}$ element:
make a hard decision on the i$^{th}$ element to obtain a decision value of the i$^{th}$ element, the i$^{th}$ element being an element in the N elements;
obtain a first Euclidean distance between an I component of the i$^{th}$ element and an I component of the decision value of the i$^{th}$ element through computation according to the i$^{th}$ element and the decision value of the i$^{th}$ element;
determine the I component of the decision value of the i$^{th}$ element as a possible value of the I component of the i$^{th}$ element when the first Euclidean distance is less than or equal to a first threshold; and
set, according to a constellation corresponding to the i$^{th}$ element, an I component value of one or two constellation points closest to the I component of the i$^{th}$ element as the possible value of the I component of the i$^{th}$ element when the first Euclidean distance is greater than the first threshold, a plurality of constellation points being in the constellation, and each constellation point representing a possible candidate value of the i$^{th}$ element;
determine state sequences corresponding to the N maximum possible candidate values as reserved sequences to obtain N groups of reserved sequences;
perform likelihood computation on the N groups of reserved sequences; and
set a reserved sequence that is in the N groups of reserved sequences and is most consistent with the element sequence as a detected sent sequence.

8. The device of claim 7, wherein the instructions further cause the processor to be configured to:
obtain a second Euclidean distance between a Q component of the i$^{th}$ element and a Q component of the decision value of the i$^{th}$ element through computation after determining the I component of the decision value of the i$^{th}$ element as the possible value of the I component of the i$^{th}$ element or setting the I component value of the one or two constellation points closest to the I component of the i$^{th}$ element as the possible value of the I component of the i$^{th}$ element;
determine the Q component of the decision value of the i$^{th}$ element as a possible value of the Q component of the i$^{th}$ element when the second Euclidean distance is less than or equal to a second threshold; and
set, according to the constellation, a Q component value of one or two constellation points closest to the Q component of the i$^{th}$ element as the possible value of the Q component of the i$^{th}$ element when the second Euclidean distance is greater than the second threshold.

9. A receiving device, comprising:
a receiver configured to receive an element sequence;
a memory coupled to the receiver and configured to store instructions, and
a processor coupled to the receiver and the memory, the instructions causing the processor to be configured to:
determine a maximum possible candidate value of each element in N elements of the received element sequence to obtain N maximum possible candidate values, N being a positive integer, and the maximum possible candidate value of each element in the N elements of the received element sequence being determined to obtain the N maximum possible candidate values by setting i to an integer from 1 to N sequentially, and separately performing the following on an i$^{th}$ element:
make a hard decision on an I component and a Q component of the i$^{th}$ element to obtain a decision value of the I component of the i$^{th}$ element and a decision value of the Q component of the i$^{th}$ element, the i$^{th}$ element being an element in the N elements;
obtain a first Euclidean distance between the I component of the i$^{th}$ element and the decision value of the I component of the i$^{th}$ element through computation;
determine the decision value of the I component of the i$^{th}$ element as a possible value of the I component of the i$^{th}$ element when the first Euclidean distance is less than or equal to a first threshold; and
set, according to a constellation corresponding to the i$^{th}$ element, an I component value of one or two constellation points closest to the I component of the i$^{th}$ element as the possible value of the I component of the i$^{th}$ element when the first Euclidean distance is greater than the first threshold, a plurality of constellation points being in the constellation, and each constellation point representing a possible candidate value of the i$^{th}$ element;
determine state sequences corresponding to the N maximum possible candidate values as reserved sequences to obtain N groups of reserved sequences;
perform likelihood computation on the N groups of reserved sequences; and set a reserved sequence that is in the N groups of reserved sequences and is most consistent with the element sequence as a detected sent sequence.

10. The device of claim 9, wherein the instructions further cause the processor to be configured to:
    obtain a second Euclidean distance between the Q component of the $i^{th}$ element and the decision value of the Q component of the $i^{th}$ element through computation after determining the decision value of the I component of the $i^{th}$ element as the possible value of the I component of the $i^{th}$ element or setting the I component value of the one or two constellation points closest to the I component of the $i^{th}$ element as the possible value of the I component of the $i^{th}$ element;
    determine the decision value of the Q component of the $i^{th}$ element as a possible value of the Q component of the $i^{th}$ element when the second Euclidean distance is less than a second threshold; and
    set, according to the constellation, a Q component value of one or two constellation points closest to the Q component of the $i^{th}$ element as the possible value of the Q component of the $i^{th}$ element when the second Euclidean distance is greater than the second threshold.

11. The device of claim 9, wherein the instructions further cause the processor to be configured to:
    obtain a second Euclidean distance between the Q component of the $i^{th}$ element and the decision value of the Q component of the $i^{th}$ element through computation after determining the decision value of the I component of the $i^{th}$ element as the possible value of the I component of the $i^{th}$ element or setting the I component value of the one or two constellation points closest to the I component of the $i^{th}$ element as the possible value of the I component of the $i^{th}$ element;
    determine the decision value of the Q component of the $i^{th}$ element as a possible value of the Q component of the $i^{th}$ element when the second Euclidean distance is equal to a second threshold; and
    set, according to the constellation, a Q component value of one or two constellation points closest to the Q component of the $i^{th}$ element as the possible value of the Q component of the $i^{th}$ element when the second Euclidean distance is greater than the second threshold.

* * * * *

UNITED STATES PATENT AND TRADEMARK OFFICE
CERTIFICATE OF CORRECTION

PATENT NO. : 10,320,523 B2
APPLICATION NO. : 15/617759
DATED : June 11, 2019
INVENTOR(S) : Bentao Wu and Bangning Mao Page 1 of 1

It is certified that error appears in the above-identified patent and that said Letters Patent is hereby corrected as shown below:

On the Title Page

Item (56), FOREIGN PATENT DOCUMENTS, Line 3: "1010877060" should read "101877060"

In the Claims

Column 19, Line 41: "the it element" should read "the $i^{th}$ element"

Signed and Sealed this
Twentieth Day of August, 2019

Andrei Iancu
*Director of the United States Patent and Trademark Office*